United States Patent
Shimatsu et al.

(10) Patent No.: US 9,829,603 B2
(45) Date of Patent: Nov. 28, 2017

(54) ANTI REFLECTION FILM, DISPLAY DEVICE, METHOD FOR SELECTING ANTI REFLECTION FILM FOR DISPLAY DEVICE

(71) Applicant: DAI NIPPON PRINTING CO., LTD., Tokyo (JP)

(72) Inventors: Tomohiko Shimatsu, Okayama (JP); Seiji Shinohara, Okayama (JP); Hiroshi Nakamura, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/864,228

(22) Filed: Sep. 24, 2015

(65) Prior Publication Data
US 2016/0091632 A1    Mar. 31, 2016

(30) Foreign Application Priority Data

Sep. 26, 2014    (JP) .................... 2014-197230

(51) Int. Cl.
G02B 1/11    (2015.01)
G02B 1/14    (2015.01)
G02B 5/28    (2006.01)

(52) U.S. Cl.
CPC ............ *G02B 1/11* (2013.01); *G02B 1/14* (2015.01); *G02B 5/286* (2013.01)

(58) Field of Classification Search
CPC .............................. G02B 5/285; G02B 5/286
See application file for complete search history.

(56) References Cited

U.S. PATENT DOCUMENTS

2008/0239488 A1* 10/2008 Asakura ............... G02B 1/111
                                                                                                  359/485.01
2009/0142561 A1* 6/2009 Zhang ................... C08J 7/042
                                                                                                  428/212

(Continued)

FOREIGN PATENT DOCUMENTS

JP      2010-152311      7/2010

*Primary Examiner* — Kimberly N Kakalec
(74) *Attorney, Agent, or Firm* — Hamre, Schumann, Mueller & Larson, P.C.

(57) ABSTRACT

To provide an antireflection film that is, in the case where a super high definition display element is used, capable of suppressing reflection on the surface of the display device, and capable of suppressing whitening, while preventing the image quality of the super high definition display element from being impaired.

An antireflection film containing a transparent substrate, having thereon a high refractive index layer and a low refractive index layer, in which the antireflection film has a diffusion light reflectance ($R_{SCE}$) measured under the following condition of 0.12% or less and is for a display element having a total light reflectance ($R_{SCI}$) of 4.0% or more, Measurement of Diffusion Light Reflectance:
A black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

10 Claims, 1 Drawing Sheet

(56) References Cited

U.S. PATENT DOCUMENTS

| | | | |
|---|---|---|---|
| 2009/0202819 A1* | 8/2009 | Asahi | G02B 1/111 |
| | | | 428/336 |
| 2011/0279757 A1* | 11/2011 | Yamada | G02F 1/133528 |
| | | | 349/96 |
| 2012/0162774 A1* | 6/2012 | Ishida | G02B 1/111 |
| | | | 359/601 |
| 2013/0034711 A1* | 2/2013 | Amano | G02B 1/118 |
| | | | 428/216 |

* cited by examiner

ANTI REFLECTION FILM, DISPLAY DEVICE, METHOD FOR SELECTING ANTI REFLECTION FILM FOR DISPLAY DEVICE

FIELD OF THE INVENTION

The present invention relates to an antireflection film, a display device, and a method for selecting an antireflection film of a display device.

BACKGROUND OF THE INVENTION

In association with the transition to terrestrial digital broadcasting in recent years, display devices capable of displaying a super high definition image are being developed. For preventing the image quality of the super high definition display devices from being impaired, the surface of the display device is demanded to have a capability of preventing outside light from being reflected.

Major examples of the measure for preventing outside light from being reflected include an antiglare treatment for reducing specularly reflected light with surface unevenness, and an antireflection treatment for reducing the reflectance through an interference effect of a multilayer thin film. In recent years, the antireflection treatment, which is easy to provide a high-quality image, is being brought into the mainstream.

The reflectance can be reduced more by increasing the number of layers of the multilayer thin film, but most products have a two-layer or three layer structure in view of the cost-benefit performance. Examples of the antireflection film of this type include one described in JP-A-2010-152311.

In recent years, even an antireflection film having a two-layer or three-layer is demanded to have an ultra low reflectance of 0.5% or less for preventing the image quality of the super high definition display device from being impaired.

However, although the antireflection film having an ultra low reflectance shows good visibility in the evaluation of antireflection capability performed commonly, in which the back surface of the film is blackened, the antireflection film may suffer whitening in some cases where the antireflection film is installed in a super high definition display device. The whitening cannot be detected as a haze, which is a common evaluation factor in the field of optical films. In other words, the whitening is low in the whiteness level and is such whiteness that is difficult to be recognized by the human under normal use environments. However, the whiteness may be recognized through careful observation in the case where the antireflection film having an ultra low reflectance is installed in a super high definition display device.

SUMMARY OF THE INVENTION

An object of the present invention is to provide an antireflection film that is, in the case where the antireflection film is used in a super high definition display element, capable of suppressing whitening while suppressing reflection on a surface of a display device, thereby preventing the image quality of the super high definition display element from being impaired, and to provide a display device. Another object of the present invention is to provide a method for selecting an antireflection film capable of efficiently selecting an antireflection film that is capable of suppressing whitening while suppressing reflection on a surface of a display device using a super high definition display element, thereby preventing the image quality of the super high definition display element from being impaired.

The present inventors have made extensive investigations for achieving the aforementioned and other objects of the present invention, and have thus found that, in the super high definition display device in recent years, (1) the density of transparent electrodes constituting the display element is increased, and the reflectance of the display element is increased, (2) the antireflection film having an ultra low reflectance generates light diffusion that cannot be detected as a haze, and (3) in the case where the antireflection film has an ultra low reflectance, whitening due to light diffusion is liable to be conspicuous.

As a result of further earnest investigations made by the present inventors, the present inventors have found that the problem of whitening occurs in such a mechanism that in the outside light incident on the display device, the proportion of light that is returned to the viewer as reflected light is increased due to the increase of the reflectance of the display element, and the reflected light thus increased again passes through the antireflection film causing light diffusion, so as to increase the extent of the light diffusion, and thus the present inventors have found a solution to the problems.

For solving the problems, the present invention relates to an antireflection film, a display device, and a method for selecting an antireflection film of a display device according to the following items [1] to [9].

[1] An antireflection film containing a transparent substrate, having thereon a high refractive index layer and a low refractive index layer, the antireflection film having a diffusion light reflectance ($R_{SCE}$) measured under the following condition of 0.12% or less, and the antireflection film being for a display element having a total light reflectance ($R_{SCI}$) of 4.0% or more, measurement of the diffusion light reflectance: a black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

[2] A display device containing a display element having a total light reflectance ($R_{SCI}$) of 4.0% or more, having thereon an antireflection film, the antireflection film containing a transparent substrate, having thereon a high refractive index layer and a low refractive index layer, and the antireflection film having a diffusion light reflectance ($R_{SCE}$) measured under the following condition of 0.12% or less, measurement of the diffusion light reflectance: a black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

[3] The display device according to the item [2], wherein the antireflection film has a ratio ($R_{SCE}/R_{SCI}$) of the diffusion light reflectance ($R_{SCE}$) and a total light reflectance ($R_{SCI}$) measured under the following condition of 0.32 or less, measurement of the total light reflectance: a black plate is adhered with a transparent adhesive to a surface of the transparent substrate of the antireflection film that is opposite to the side of the high refractive index layer to prepare a specimen, and a surface of the specimen on the side of the low refractive index layer is measured for a total light reflectance ($R_{SCI}$).

[4] The display device according to the item [2] or [3], wherein the antireflection film has a reflectance Y value measured under the following condition of 0.5% or less, measurement of the reflectance Y value of the antireflection film: a black plate is adhered with a transparent adhesive to a surface of the transparent substrate of the antireflection film that is opposite to the side of the high refractive index layer to prepare a specimen, and a surface of the specimen on the side of the low refractive index layer is measured for a reflectance Y value.

[5] The display device according to any one of the items [2] to [4], wherein the high refractive index layer contains high refractive index particles.

[6] The display device according to any one of the items [2] to [5], wherein the low refractive index layer contains low refractive index particles.

[7] The display device according to any one of the items [2] to [6], wherein the display element has a number of pixels of 3,840×2,160 or more.

[8] The display device according to any one of the items [2] to [7], wherein the display device contains a touch panel on the display element, and contains the antireflection film on the touch panel.

[9] A method for selecting an antireflection film of a display device, containing selecting, as an antireflection film for a display device containing a display element having a total light reflectance ($R_{SCI}$) of 4.0% or more, an antireflection film which contains a transparent substrate, having thereon a high refractive index layer and a low refractive index layer, and has a diffusion light reflectance ($R_{SCE}$) measured under the following condition of 0.12% or less, measurement of the diffusion light reflectance: a black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

According to the antireflection film and the display device of the present invention, the whitening due to reflected light of a super high definition display element having a high reflectance can be suppressed while suppressing reflection on the surface of the display device, thereby preventing the image quality of the super high definition display element from being impaired.

Furthermore, according to the method for selecting an antireflection film of the display device of the present invention, such an antireflection film can be efficiently selected that is capable of suppressing the whitening while suppressing reflection on a surface of a super high definition display element, thereby preventing the image quality of the super high definition display element from being impaired.

DETAILED DESCRIPTION OF THE INVENTION

Display Device

The display device of the present invention contains a display element having a total light reflectance ($R_{SCI}$) of 4.0% or more, having thereon an antireflection film, in which the antireflection film contains a transparent substrate, having thereon a high refractive index layer and a low refractive index layer, and the antireflection film has a diffusion light reflectance ($R_{SCE}$) measured under the following condition of 0.12% or less.

Measurement of Diffusion Light Reflectance:

A black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

Figure 1:
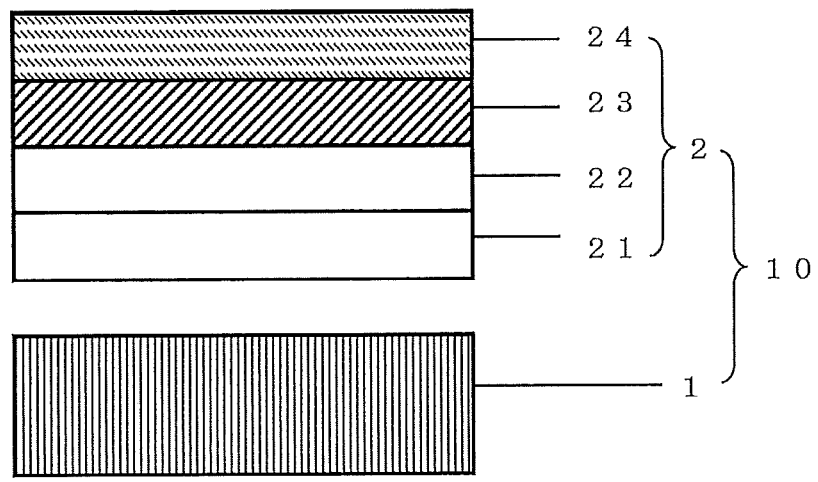
FIG. 1 is a cross sectional view showing an example of the display device of the present invention.
Figure 2:
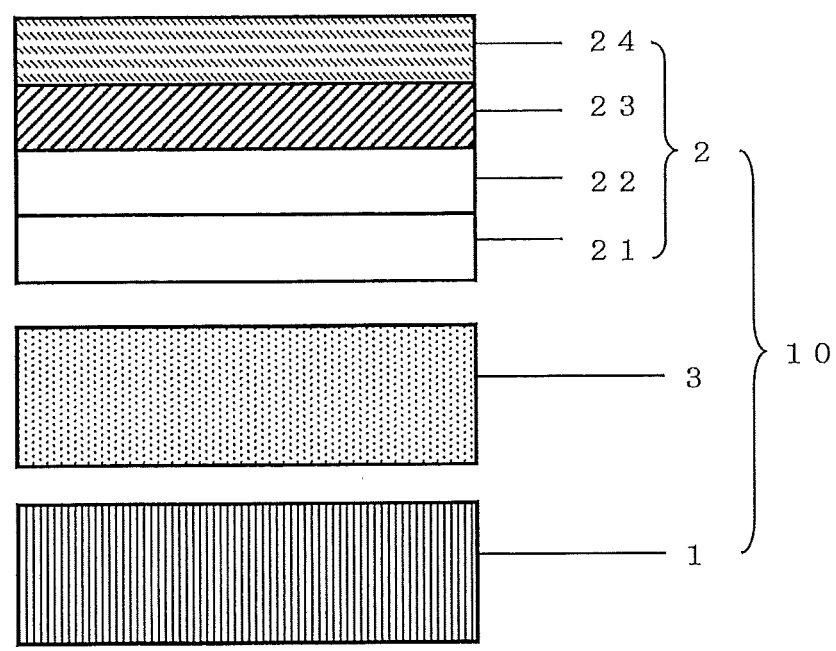
FIG. 2 is a cross sectional view showing another example of the display device of the present invention.

FIGS. 1 and 2 are cross sectional views showing embodiments of the display device 10 of the present invention. The display devices 10 shown in FIGS. 1 and 2 each has a display element 1 having thereon an antireflection film 2 having a transparent substrate 21 having thereon a hardcoat layer 22, a high refractive index layer 23, and a low refractive index layer 24. The display device 10 shown in FIG. 2 further has a touch panel 3 disposed between the display element 1 and the antireflection film 2.

As shown in FIGS. 1 and 2, the antireflection film 2 is disposed on the display element 1 in such a manner that the surface thereof on the side of the transparent substrate 21 is directed to the side of the liquid crystal display element 1. As shown in FIGS. 1 and 2, the antireflection film 2 is preferably used as the outermost surface of the display device 10.

Display Element

Examples of the display element constituting the display device of the present invention include a liquid crystal display element, a plasma display element and an organic EL display element. The display element has a patterned transparent electrode for driving the display element. The transparent electrode is formed of a material having a high reflectance, such as ITO, and has a pattern with an increased density associated with the enhancement of the definition of the display element to a super high definition, and thereby the display element has an increased reflectance. In the present invention, the display element used is a display element having a total light reflectance ($R_{SCI}$) of 4.0% or more. The upper limit of the total light reflectance ($R_{SCI}$) of the display element may be approximately 15.0%.

The specific structure of the display element is not particularly limited. For example, a liquid crystal display device may have a basic structure containing a lower glass substrate, a lower transparent electrode, a liquid crystal layer, an upper transparent electrode, a color filter, and an upper glass substrate in this order, and in a super high definition liquid crystal display element, the lower transparent electrode and the upper transparent electrode are patterned with a high density.

The total light reflectance ($R_{SCI}$) is a reflectance that is calculated in such a manner that light is made incident on the surface of the display element omnidirectionally with an integrating sphere, the entire reflected light including the specularly reflected direction is measured by closing the light trap, and the total light reflectance ($R_{SCI}$) is calculated from the measured value. The diffusion light reflectance ($R_{SCE}$) described later is a reflectance that is calculated in such a manner that light is made incident on the surface of the specimen omnidirectionally with an integrating sphere, the reflected light except for the reflected light that passes through the light trap is measured while opening the light trap corresponding to the specularly reflection direction, and the diffusion light reflectance ($R_{SCE}$) is calculated from the measured value. In a representative example of the measuring device for $R_{SCE}$ and $R_{SCI}$, the position of the photoreceiver is +8° with respect to the normal line of the specimen, the aperture angle of the photoreceiver is 10°, the position of the light trap is −8° with respect to the normal line of the specimen, and the cover range of the light trap is 10°. Specific examples of the photoreceiver include CM-2002, a trade name, produced by Konica Minolta, Inc. The $R_{SCI}$ of the display element can be measured by the method described in the examples.

The display element is preferably has a resolution with a number of pixels of 3,840×2,160 or more, i.e., a so-called 4K resolution or higher. A super high definition display element having a 4K resolution or higher has a high reflectance due to the high density of the transparent electrode constituting the display device, and thus is liable to suffer whitening of the antireflection film due to reflected light. The super high definition display element is liable to suffer the influence of whitening due to the small amount of light per one pixel. Accordingly, a display element having a 4K resolution or higher is preferred in the present invention since the effects of the present invention are easily exhibited.

Examples of the display element having a 4K resolution or higher include a display element having a number of pixels of 3,840×2,160 and a display element having a number of pixels of 4,096×2,160. The display element having a 4K resolution or higher generally has a screen size of approximately from 40 to 85 inch diagonal.

Even a display element having a number of pixels of less than 3,840×2,160 is also preferred since the effects of the present invention are easily exhibited, as far as the display element has a pixel density of 250 ppi or more.

The mechanism of the whitening occurring in the case where an ordinary antireflection film having an ultra low reflectance is provided on a display element having a total light reflectance ($R_{SCI}$) of 4.0% or more is considered to be as follows.

An antireflection film having a multilayer thin film having a two-layer structure or a three-layer structure has such a tendency that the reflectance thereof is lowered by decreasing the refractive index of the low refractive index layer and increasing the refractive index of the high refractive index layer. For increasing the refractive index of the high refractive index layer, it is effective to add a large amount of high refractive index particles to the high refractive index layer. The whitening may be suppressed in the case where the high refractive index particles are dispersed in the high refractive index layer without aggregation, so as to maintain the small average particle diameter thereof, by which the light diffusion caused by the particles has a diffusion distribution having a tail that is not broadened. However, conductive particles may be used as the high refractive index particles for imparting an antistatic function thereto in recent years, and there are cases where the conductive particles are not dispersed excessively since the antistatic function can be easily exhibited by aggregating the conductive particles to form a network. Furthermore, in the case where a large amount of the high refractive index particles are used, it is difficult to disperse the particles uniformly, and there is a tendency that the high refractive index particles are aggregated. Moreover, with the increase of the particle diameter of the aggregated particles, the tail of the diffusion distribution is broadened. On the other hand, an antireflection film having an ultra low reflectance has a low surface reflectance Y value, and thus the tail of the diffusion distribution diffused by the aggregated particles becomes conspicuous, by which whitening is recognized. In the case where the amount reflected light from a display element is increased due to the display element having a total light reflectance ($R_{SCI}$) of 4.0% or more, the problem of whitening due to the light diffusion of the aggregated particles becomes conspicuous.

An Tireflection Film

The antireflection film constituting the display device of the present invention contains a transparent substrate, having thereon a high refractive index layer and a low refractive index layer. The high refractive index layer and the low refractive index layer have a function of imparting an antireflection capability thereto through an interference effect of a multilayer thin film. The antireflection film may be imparted with the antireflection capability through an interference effect of a multilayer thin film having three layers or more by further providing an intermediate refractive index layer or the like, but in view of the cost-benefit performance, the multilayer thin film preferably has a two-layer structure containing a high refractive index layer and a low refractive index layer.

The antireflection film constituting the display device of the present invention has a diffusion light reflectance ($R_{SCE}$) measured under the following condition of 0.12% or less.

Measurement of Diffusion Light Reflectance:

A black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

The transparent adhesive to be used has a refractive index that has a difference in refractive index from the transparent substrate and the black plate of 0.05 or less. The preferred condition for the refractive index is the same as in the measurements of $R_{SCI}$ and Y value described later.

The diffusion light reflectance ($R_{SCE}$), the total light reflectance ($R_{SCI}$) and the Y value of the antireflection film may be specifically measured by the methods described in the examples described later.

The total light reflectance ($R_{SCI}$) is a reflectance that is calculated from the entire omnidirectionally reflected light including the specularly reflected direction, whereas the diffusion light reflectance ($R_{SCE}$) is a reflectance that is calculated from the reflected light except for the reflected light that is in the specularly reflected direction. The antireflection film has a substantially smooth surface, and thus the proportion of the diffusion reflected light is small with respect to the specularly reflected light. Accordingly, $R_{SCE}$, which is obtained by subtracting the specularly reflected light from the total reflected light, can be said as a parameter that is suitable for expressing the diffusion reflected light, which is a very minor component.

In the case where an antireflection film having $R_{SCE}$ exceeding 0.12% is provided on a display element having a large total light reflectance ($R_{SCI}$), the light which is reflected by the display element and again passes through the antireflection film is diffused by the diffusion component in the antireflection film, and thus is recognized as whitening. In particular, the antireflection film having an ultra low reflectance has a low surface reflectance Y value, and thus the diffused light diffused in the antireflection film becomes conspicuous, by which whitening is recognized.

$R_{SCE}$ is preferably 0.11% or less. The lower limit of $R_{SCE}$ is not particularly limited and may be approximately 0.05%.

The antireflection film preferably has a ratio ($R_{SCE}/R_{SCI}$) of $R_{SCE}$ and a total light reflectance ($R_{SCI}$) measured under the following condition of 0.32 or less, more preferably 0.30 or less, and further preferably 0.25 or less.

Measurement of Total Light Reflectance:

A black plate is adhered with a transparent adhesive to a surface of the transparent substrate of the antireflection film that is opposite to the side of the high refractive index layer to prepare a specimen, and a surface of the specimen on the side of the low refractive index layer is measured for a total light reflectance ($R_{SCI}$).

The ratio $R_{SCE}/R_{SCI}$ of the antireflection film being 0.32 or less means that the proportion of the diffusion reflected light is smaller than the specularly reflected light. Accordingly, in the case where the ratio $R_{SCE}/R_{SCI}$ is 0.32 or less while satisfying the condition of the present invention for $R_{SCE}$, the diffusion reflected light can be further prevented from being conspicuous (i.e., whitening can be further prevented from being recognized). The ratio $R_{SCE}/R_{SCI}$ is preferably 0.10 or more from the standpoint of preventing the specularly reflected light from being increased unnecessarily.

The antireflection film of the present invention preferably has a ratio $R_{SCE}/(R_{SCI}-R_{SCE})$ of 0.50 or less, more preferably 0.40 or less, and further preferably 0.30 or less.

The ratio $R_{SCE}/(R_{SCI}-R_{SCE})$ being 0.50 or less means that the proportion of the diffusion reflected light is smaller than the specularly reflected light. Accordingly, in the case where the ratio $R_{SCE}/(R_{SCI}-R_{SCE})$ is 0.50 or less while satisfying the condition of the present invention for $R_{SCE}$, the diffusion reflected light can be further prevented from being conspicuous (i.e., whitening can be further prevented from being recognized). The ratio $R_{SCE}/(R_{SCI}-R_{SCE})$ is preferably 0.10 or more from the standpoint of preventing the specularly reflected light from being increased unnecessarily.

The value for $R_{SCI}$ of the antireflection film of the present invention is not particularly limited, and from the standpoint of preventing the specularly reflected light from being increased unnecessarily, $R_{SCI}$ is preferably 0.80% or less, more preferably 0.75% or less, and further preferably 0.70% or less.

The antireflection film preferably has an ultra low reflectance, and specifically the antireflection film preferably has a reflectance Y value of 0.50% or less, and more preferably 0.45% or less. The reflectance Y value of the antireflection film means the Y value of the CIE 1931 standard colorimetric system, and may be measured by the following manner.

Measurement of Reflectance Y Value of Antireflection Film:

A black plate is adhered with a transparent adhesive to a surface of the transparent substrate of the antireflection film that is opposite to the side of the high refractive index layer to prepare a specimen, and a surface of the specimen on the side of the low refractive index layer is measured for a reflectance Y value.

The antireflection film of the present invention preferably has a total light transmittance (JIS K7361-1:1997) of 90% or more, and more preferably 92% or more. The antireflection film of the present invention preferably has a haze (JIS K7136:2000) of 1.0% or less, more preferably 0.5% or less, and further preferably 0.3% or less.

The light incident surface on measuring the total light transmittance and the haze is the side of the transparent substrate.

The surface of the antireflection film (the surface on the side of the low refractive index layer) preferably has an arithmetic average roughness Ra (JIS B0601:1994) of 10 nm or less, and more preferably from 1 to 8 nm. The surface of the antireflection film (the surface on the side of the low refractive index layer) preferably has a ten-point average roughness Rz (JIS B0601:1994) of 160 nm or less, and more preferably from 50 to 155 nm.

In the case where Ra and Rz are in the aforementioned ranges, the antireflection film may have smoothness and may be enhanced in scratch resistance.

Transparent Substrate

The transparent substrate of the antireflection film is not particularly limited, as far as it is a transparent one that is generally used as a substrate of an antireflection film, and from the standpoint of the material cost, the productivity and the like, a plastic film, a plastic sheet or the like may be preferably appropriately selected depending on the purposes.

Examples of the plastic film and the plastic sheet include those formed of various synthetic resins. Preferred examples of the synthetic resin include a cellulose resin, such as a triacetyl cellulose resin (TAC), a diacetyl cellulose resin, a cellulose acetate butyrate resin, and cellophane; a polyester resin, such as a polyethylene terephthalate resin (PET), a polybutylene terephthalate resin, a polyethylene naphthalate isophthalate copolymer resin, and a polyester thermoplastic elastomer; a polyolefin resin, such as a low density polyethylene resin (including a linear low density polyethylene resin), a medium density polyethylene resin, a high density polyethylene resin, an ethylene-α-olefin copolymer, a polypropylene resin, a polymethylpentene resin, a polybutene resin, an ethylene-propylene copolymer, a propylene-butene copolymer, an olefin thermoplastic elastomer, and mixtures of these polymers; an acrylic resin, such as a polymethyl (meth)acrylate resin, a polyethyl (meth)acrylate resin, and a polybutyl (meth)acrylate resin; a polyamide resin, such as nylon 6 and nylon 66; a polystyrene resin; a polycarbonate resin; a polyarylate resin; and a polyimide resin.

The transparent substrate may be a single material or a mixture of two or more materials selected from the aforementioned plastic films and plastic sheet, and from the standpoint of the flexibility, the toughness, the transparency and the like, a cellulose resin and a polyester resin are preferred, and a triacetyl cellulose resin (TAC) and a polyethylene terephthalate resin (PET) are more preferred.

The thickness of the transparent substrate is not particularly limited and may be appropriately selected depending on the purposes, but the thickness is generally from 5 to 130 μm, and in consideration of the durability, the handleability and the like, the thickness is preferably from 10 to 100 μm.

Hardcoat Layer

The antireflection film preferably has a hardcoat layer between the transparent substrate and the high refractive index layer, for enhancing the scratch resistance of the antireflection film. The hardcoat layer herein means a layer that shows a hardness of H or higher in terms of the pencil hardness test defined in JIS K5600-5-4:1999.

The hardcoat layer preferably contains a cured product of a curable resin composition, such as a thermosetting resin composition or an ionizing radiation-curable resin composition, and from the standpoint of the further enhancement of the scratch resistance, the hardcoat layer more preferably contains a cured product of an ionizing radiation-curable resin composition.

The thermosetting resin composition is a composition that contains at least a thermosetting resin, and is a resin composition that is cured by heating.

Examples of the thermosetting resin include an acrylic resin, a urethane resin, a phenol resin, a urea melamine resin, an epoxy resin, an unsaturated polyester resin, and a silicone resin. The thermosetting resin composition contains the thermosetting resin and, in addition, a curing agent depending on necessity.

The ionizing radiation-curable resin composition is a composition that contains a compound having an ionizing radiation-curable functional group (which may be hereinafter referred to as an ionizing radiation-curable compound). Examples of the ionizing radiation-curable functional group include an ethylenic unsaturated group, such as a (meth)acryloyl group, a vinyl group, and an allyl group, an epoxy group, and an oxetanyl group. The ionizing radiation-curable compound is preferably a compound having an ethylenic unsaturated group, and more preferably a compound having two or more ethylenic unsaturated groups, and among these, a polyfunctional (meth)acrylate compound having two or more ethylenic unsaturated groups is further preferred. As the polyfunctional (meth)acrylate compound, any of a monomer and an oligomer may be used.

The ionizing radiation means a radiation that has an energy quantum capable of polymerizing or crosslinking molecules, among electromagnetic waves and charged particle radiations. In general, an ultraviolet ray (UV) or an electron beam (EB) may be used, and in addition, an electromagnetic wave, such as an X-ray and a γ-ray, and a charged particle radiation, such as an α-ray and an ion beam, may also be used.

Examples of the bifunctional (meth)acrylate monomer as the polyfunctional (meth)acrylate compound include ethylene glycol di(meth)acrylate, bisphenol A tetraethoxydiacrylate, bisphenol A tetrapropoxydiacrylate, and 1,6-hexanediol diacrylate.

Examples of trifunctional or higher functional (meth)acrylate monomer include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

The (meth)acrylate monomer may have a modified partial molecular structure, and examples thereof include those modified with ethylene oxide, propylene oxide, caprolactone, isocyanuric acid, an alkyl group, a cyclic alkyl group, an aromatic group, bisphenol, or the like.

Examples of the polyfunctional (meth)acrylate oligomer include an acrylate polymer, such as a urethane (meth)acrylate, an epoxy (meth)acrylate, a polyester (meth)acrylate, and a polyether (meth)acrylate.

The urethane (meth)acrylate may be obtained, for example, through reaction of a polyhydric alcohol, an organic diisocyanate, and a hydroxy (meth)acrylate.

Preferred examples of the epoxy (meth)acrylate include a (meth)acrylate obtained by reacting a trifunctional or higher functional aromatic epoxy resin, alicyclic epoxy resin, aliphatic epoxy resin or the like, and (meth)acrylic acid, a (meth)acrylate compound obtained by reacting a bifunctional or higher functional aromatic epoxy resin, alicyclic epoxy resin, aliphatic epoxy resin or the like, a polybasic acid, and (meth)acrylic acid, and a (meth)acrylate obtained by reacting a bifunctional or higher functional aromatic epoxy resin, alicyclic epoxy resin, aliphatic epoxy resin or the like, a phenol compound, and (meth)acrylic acid.

The ionizing radiation-curable compound may be used solely or as a combination of two or more kinds thereof.

In the case where the ionizing radiation-curable compound is an ultraviolet ray-curable compound, the ionizing radiation-curable composition preferably contains an additive, such as a photopolymerization initiator and a photopolymerization accelerator.

Examples of the photopolymerization initiator include at least one selected from acetophenone, benzophenone, an α-hydroxyalkylphenone, a Michler's ketone, benzoin, benzyldimethylketal, benzoyl benzoate, an α-acyloxime ester, and a thioxanthone compound. The photopolymerization initiator preferably has a melting point of 100° C. or more. When the melting point of the photopolymerization initiator is 100° C. or more, a phenomenon in which the remaining photopolymerization initiator is sublimated with heat in the formation of the transparent conductive film or the crystallization process to thereby reduce resistance of the transparent conductive film may be prevented. The same preferred embodiment for a photopolymerization initiator may be applied to the case described later where a photopolymerization initiator is used in the high refractive index layer and the low refractive index layer.

The photopolymerization accelerator may enhance the curing rate through the reduction of polymerization inhibition due to the air on curing, and examples thereof include at least one selected from isoamyl p-dimethylaminobenzoate and ethyl p-dimethylaminobenzoate.

The thickness of the hardcoat layer is preferably in a range of from 0.1 to 100 μm, and more preferably in a range of from 0.8 to 20 μm. When the thickness of the hardcoat layer is in the range, a sufficient hardcoat capability may be obtained, by which cracks and the like may be prevented from occurring on application of an external impact, so as to prevent breakage.

The thickness of the hardcoat layer, and the thicknesses of the high refractive index layer and the low refractive index layer described later may be measured, for example, such a manner that on a cross sectional image of the layer obtained with a scanning electron microscope (SEM), a transmission electron microscope (TEM) or a scanning transmission electron microscope (STEM), the layer is measured for thickness in 20 points, and the average of the measured values in the 20 points is designated as the thickness. An SEM is preferably used in the case where the thickness to be measured is in a μm order, and a TEM or an STEM is preferably used in the case where the thickness to be measured is in a nanometer order. For an SEM, the acceleration voltage is preferably from 1 to 10 kV, and the magnification is preferably from 1,000 to 7,000, and for a TEM or an STEM, the acceleration voltage is preferably from 10 to 30 kV, and the magnification is preferably from 50,000 to 300,000.

The refractive index of the hardcoat layer may be smaller than the refractive index of the high refractive index layer described later, and is preferably in a range of from 1.45 to 1.70, and more preferably in a range of from 1.45 to 1.60. In the case where the refractive index of the hardcoat layer is in the range, there may be no difficulty in controlling the refractive index of the high refractive index layer. From the standpoint of the suppression of interference fringes, the difference between the refractive index of the hardcoat layer and the refractive index of the transparent substrate is preferably small.

The refractive index of the hard coat layer, and the refractive indices of the high refractive index layer and the low refractive index layer described later may be calculated, for example, by fitting of the reflectance spectrum measured with a reflection photometer and the reflectance spectrum calculated from an optical model of a multilayer thin film using the Fresnel coefficient.

The hardcoat layer may be formed, for example, in such a manner that the curable resin composition and depending on necessity, the additive, such as an ultraviolet ray absorbent and a leveling agent, are mixed with a diluting solvent to prepare a coating composition for forming a hardcoat layer, and the coating composition is coated on the transparent substrate by a known coating method, dried, and depending on necessity, cured through irradiation with an ionizing radiation, thereby forming the hardcoat layer.

High Refractive Index Layer

The high refractive index layer may be formed, for example, with a coating composition for a high refractive index layer containing a curable resin composition and high refractive index particles.

The high refractive index layer preferably has a higher refractive index from the standpoint of imparting an ultra low reflectance to the antireflection film, but a large amount of the high refractive index particles are required for increasing the refractive index, which may cause whitening due to the aggregation and the network formation of the high refractive index particles. Accordingly, the refractive index is preferably from 1.55 to 1.85, and more preferably from 1.56 to 1.70.

The thickness of the high refractive index layer is preferably 200 nm or less, and more preferably from 50 to 180 nm. In the case where the high refractive index layer has the two-layer structure described later, the total thickness of the two layers preferably satisfies the aforementioned range.

The high refractive index layer may be formed of plural layers each satisfying the aforementioned range of the refractive index, and the number of layers is preferably 2 or less from the standpoint of the cost-benefit performance.

Examples of the high refractive index particles include antimony pentoxide (1.79), zinc oxide (1.90), titanium oxide (2.3 to 2.7), cerium oxide (1.95), tin-doped indium oxide (1.95 to 2.00), antimony-doped tin oxide (1.75 to 1.85), yttrium oxide (1.87), and zirconium oxide (2.10). The numerals in the parentheses are refractive indices of the materials constituting the particles.

Among these kinds of high refractive index particles, those having a refractive index exceeding 2.0 are preferred from the standpoint of the achievement of the preferred refractive index with a small amount thereof added. The high refractive index particles that have conductivity, such as antimony pentoxide, tin-doped indium oxide (ITO), and antimony-doped tin oxide (ATO), have free electrons having a plasma oscillation frequency that is in the near infrared region, and light in the visible region is also partially absorbed or reflected due to the plasma oscillation of the free electrons, resulting in a problem of coloration in some cases. Accordingly the high refractive index particles are preferably non-conductive particles.

In view of these factors, among the high refractive index particles described above, titanium oxide and zirconium oxide are preferred, and zirconium oxide is more preferred from the standpoint of the high durability and stability thereof, such as the light resistance. In the case where it is intended to impart antistatic property to the antireflection film, it is preferred that the high refractive index layer is formed to have the two-layer structure described later, and the conductive high refractive index particles are added to one of the layers.

The average particle diameter of the primary particles of the high refractive index particles is preferably from 5 to 200 nm, more preferably from 5 to 100 nm, and further preferably from 10 to 80 nm.

The average particle diameter of the primary particles of the high refractive index particles and the low refractive index particles described later can be calculated through the following operations (1) to (3).

(1) A film obtained by coating and drying the particles themselves or a dispersion liquid of the particles on a transparent substrate is pictured for a surface image with an SEM, a TEM or an STEM.

(2) Arbitrary 10 particles are extracted from the surface image, the respective particles are measured for the long diameter and the short diameter, and see an average diameter of the long diameter and the short diameter as the particle diameters of the respective particles. The long diameter is the longest diameter of the particle observed on the surface image, and the short diameter is obtained in such a manner that a line is drawn perpendicular to the line segment constituting the long diameter on the middle point of the line segment, and the distance between two points, at which the perpendicular line crosses the boundary of the particle, is designated as the short diameter.

(3) The operation (2) is performed for other surface images of the same specimen to thereby repeat the operation (2) five times, and the number average value of the particle diameters of 50 particles in total is designated as the average particle diameter.

In the calculation of the average particle diameter of the particles, an SEM is preferably used in the case where the average particle diameter to be calculated is in a μm order, and a TEM or an STEM is preferably used in the case where the average particle diameter to be calculated is in a nanometer order. For an SEM, the acceleration voltage is preferably from 1 to 10 kV, and the magnification is preferably from 1,000 to 7,000, and for a TEM or an STEM, the acceleration voltage is preferably from 10 to 30 kV, and the magnification is preferably from 50,000 to 300,000.

The content of the high refractive index particles is preferably from 30 to 300 parts by mass, more preferably from 30 to 100 parts by mass, and further preferably from 35 to 75 parts by mass, per 100 parts by mass of the curable resin composition, from the standpoint of the balance between the achievement of a high refractive index and the suppression of whitening.

The high refractive index layer is preferably subjected to dispersion stabilization for suppressing the excessive aggregation of the high refractive index particles. Examples of a measure for the dispersion stabilization include a measure of adding additional high refractive index particles to high refractive index particles being a base, in which the additional high refractive index particles have a surface charge amount that is smaller than the high refractive index particles being a base. According to the measure, the high refractive index particles being a base appropriately gather around the additional high refractive index particles, and thereby the high refractive index particles being a base can be suppressed from being excessively aggregated. Examples of the measure also include the use of the high refractive index particles that have been surface-treated, and the addition of a dispersant to the coating composition for the high refractive index layer.

Examples of the curable resin composition constituting the high refractive index layer include those described for the hardcoat layer, and an ionizing radiation-curable resin composition is preferred.

For providing the aforementioned refractive index while preventing the addition amount of the high refractive index particles from becoming excessive, the curable resin composition to be used preferably has a high refractive index. The refractive index of the curable resin composition is preferably approximately from 1.54 to 1.70.

The high refractive index layer may have a two-layer structure containing a high refractive index layer (A) positioned on the side of the hardcoat layer and a high refractive index layer (B) positioned on the side of the low refractive index layer. In this case, the refractive index of the high refractive index layer (B) is preferably higher than the refractive index of the high refractive index layer (A). The use of the structure of the high refractive index layer can increase the difference in refractive index from the low refractive index layer, and consequently the reflectance can be decreased, and the difference in refractive index between the high refractive index layer and the hardcoat layer can be decreased to suppress interference fringes from being formed.

In the case where the high refractive index layer is formed to have the two-layer structure, the refractive index of the high refractive index layer (A) is preferably from 1.55 to 1.7, and the refractive index of the high refractive index layer (B) is preferably from 1.6 to 1.85.

In the two-layer structure, it is preferred that conductive high refractive index particles are contained in one of the high refractive index layer (A) and the high refractive index layer (B), whereas non-conductive high refractive index particles are contained in the other thereof, and the thickness of the layer containing the conductive high refractive index particles is made smaller than the thickness of the layer containing the non-conductive high refractive index particles. According to the structure, antistatic property can be imparted while suppressing the amount of the conductive high refractive index particles which may be a factor of coloration. Furthermore, the conductive high refractive index particles are preferably used since the addition thereof may impart antistatic property with a small amount thereof through the network formation in the layer, which may result in the suppression of coloration and whitening.

The high refractive index layer may be formed, for example, in such a manner that the high refractive index particles, the curable resin composition, and depending on necessity, the additive, such as an ultraviolet ray absorbent and a leveling agent, are mixed with a diluting solvent to prepare a coating composition for forming the high refractive index layer, and the coating composition is coated on the hardcoat layer by a known coating method, dried, and depending on necessity, cured through irradiation with an ionizing radiation, thereby forming the high refractive index layer.

Low Refractive Index Layer

The low refractive index layer is provided on the high refractive index layer.

For imparting an ultra low reflectance to the antireflection film, the low refractive index layer preferably has a refractive index of from 1.26 to 1.36, more preferably from 1.28 to 1.34, and further preferably from 1.30 to 1.32.

The more the refractive index of the low refractive index layer is decreased, the more the refractive index of the antireflection film can be decreased without increasing the refractive index of the high refractive index layer excessively. On the other hand, when the refractive index of the low refractive index layer is too low, the strength of the low refractive index layer is tend to be lowered. Accordingly, the refractive index of the low refractive index layer is preferably within the aforementioned range, by which the amount of the high refractive index particles added to the high refractive index layer can be suppressed while retaining the strength of the low refractive index layer, thereby suppressing whitening.

The thickness of the low refractive index layer is preferably from 80 to 120 nm, more preferably from 85 to 110 nm, and further preferably 90 to 105 nm.

The method for forming the low refractive index layer may be classified roughly into a wet method and a dry method. Examples of the wet method include a method of forming the layer by a sol-gel method using a metal alkoxide or the like, a method of forming the layer by coating a resin having a low refractive index, such as a fluorine resin, and a method of forming the layer by coating a coating composition for forming the low refractive index layer containing a resin composition and low refractive index particles. Examples of the dry method include a method of selecting particles having a desired refractive index from the low refractive index particles described later, and forming the layer by a physical vapor deposition method or a chemical vapor deposition method.

The wet method is excellent in production efficiency, and in the present invention, the low refractive index layer is preferably formed by, among the wet methods, the method of forming the layer by coating a coating composition for forming the low refractive index layer containing a resin composition and low refractive index particles.

The low refractive index particles are preferably used for decreasing the refractive index, i.e., for enhancing the antireflection characteristics, and while any of inorganic particles, such as silica and magnesium fluoride, and organic particles may be used without particular limitation, particles having a structure with voids by themselves are preferably used from the standpoint of the enhancement of the antireflection characteristics and the securement of the favorable surface hardness.

The particles having a structure with voids by themselves have minute voids thereinside, which are filled with a gas, such as the air having a refractive index of 1.0, and thus have a low refractive index by themselves. Examples of the particles having voids include inorganic and organic porous particles and hollow particles, and specific examples thereof include porous silica particles, hollow silica particles, and porous polymer particles and hollow polymer particles formed of an acrylic resin or the like. Preferred examples of the inorganic particles include silica particles having voids that are prepared by using the technique described in JP-A-2001-233611, and preferred examples of the organic particles include hollow polymer particles that are prepared by using the technique described in JP-A-2002-80503. The silica particles having voids and the porous silica particles have a refractive index in a range of from 1.18 to 1.44, which is lower than ordinary silica particles having a refractive index of approximately 1.45, and therefore are preferred from the standpoint of decreasing the refractive index of the low refractive index layer.

The hollow silica particles have a function of decreasing the refractive index of the low refractive index layer while retaining the strength of the coated film of the low refractive index layer. The hollow silica particles used in the present invention are silica particles that have a structure with a hollow thereinside. The refractive index of the hollow silica particles is lowered from the refractive index inherent to silica (approximately 1.45) inversely proportional to the occupancy of the hollow thereinside. Accordingly, the refractive index of the entire particles of the hollow silica particles may be from 1.18 to 1.44.

The hollow silica particles are not particularly limited, and may be, for example, particles that have an outer shell and a porous structure or a hollow inside the outer shell, and examples thereof include silica particles that are prepared by using the techniques described in JP-A-6-330606, JP-A-7-013137, JP-A-7-133105 and JP-A-2001-233611.

The average particle diameter of the primary particles of the low refractive index particles is preferably from 5 to 200 nm, more preferably from 5 to 100 nm, and further preferably from 10 to 80 nm. When the average particle diameter of the primary particles is in the range, the transparency of the low refractive index layer may not be impaired, and a good dispersion state of the particles may be obtained. In particular, the low refractive index particles are preferably hollow particles having an average particle diameter of from 70 to 80 nm since the porosity may be increased to lower the refractive index while retaining the thickness of the outer shell for preventing the strength from being short, and the particles have good balance to the thickness of the low refractive index layer that is optimum for decreasing the refractive index (approximately 100 nm).

The low refractive index particles used in the present invention are preferably surface-treated. The surface treatment for the low refractive index particles is preferably a surface treatment using a silane coupling agent, and more preferably a surface treatment using a silane coupling agent having a (meth)acryloyl group. The surface treatment applied to the low refractive index particles may enhance the affinity of the particles with the binder resin described later, so as to enhance the uniformity of the dispersion state of the particles, and to prevent the particles from being aggregated, and thus the phenomena due to the increase of the particle size due to the aggregation may be suppressed, such as the decrease of the transparency of the low refractive index layer, the deterioration of the coating property of the coating composition for forming the low refractive index layer, and the deterioration of the strength of the coated film of the coating composition.

In the case where the silane coupling agent has a (meth)acryloyl group, the silane coupling agent has ionizing radiation-curing property and thus is easily reacted with the binder resin described later, and therefore the low refractive index particles are favorably fixed to the binder resin inside the coated film of the coating composition for the low refractive index layer. In other words, the low refractive index particles function as a crosslinking agent in the binder resin. Accordingly, the entire coated film may be tightened, and thereby an excellent surface hardness can be imparted to the low refractive index layer while retaining the flexibility inherent to the binder resin. Consequently, the low refractive index layer may exhibit an absorbing capability and a restoring capability against external impacts through the deformation thereof due to the good flexibility, thereby suppressing scratches from being formed, and thus the layer may have a high surface hardness which exhibits excellent scratch resistance.

Examples of the silane coupling agent that is preferably used for the surface treatment to the low refractive index particles include 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 2-(meth)acryloxypropyltrimethoxysilane, and 2-(meth)acryloxypropyltriethoxysilane.

The content of the low refractive index particles in the low refractive index layer is preferably from 10 to 250 parts by mass, more preferably from 50 to 200 parts by mass, and further preferably from 100 to 180 parts by mass, per 100 parts by mass of the resin in the low refractive index layer. When the content of the low refractive index particles is in the range, good antireflection characteristics and good surface hardness may be obtained.

The proportion of the hollow particles and/or the porous particles in the entire low refractive index particles contained in the low refractive index layer is preferably 70% by mass or more, more preferably 80% by mass or more, and further preferably from 80 to 95% by mass.

Examples of the resin composition contained in the coating composition for forming the low refractive index layer include a curable resin composition. The curable resin composition used may be the same ones as described for the hardcoat layer, and an ionizing radiation-curable resin composition is preferred.

Preferred examples of the resin composition also include a fluorine-containing polymer that exhibits a low refractive index property by itself. The fluorine-containing polymer is a polymer of a polymerizable compound that contains at least a fluorine atom in the molecule thereof, and is preferred since antifouling property and slipping property can be imparted. The fluorine-containing polymer preferably has a reactive group in the molecule thereof to function as a curable resin composition, and more preferably has an ionizing radiation-curable reactive group to function as an ionizing radiation-curable resin composition.

The fluorine-containing polymer preferably contains silicon in addition to fluorine, so as not only to repel contamination on the surface of the low refractive index layer, but also to impart good wipeability of the contamination thus repelled. Preferred examples thereof include a silicone-containing vinylidene fluoride copolymer obtained by adding a silicone component to a copolymer. Examples of the silicone component herein include (poly)dimethylsiloxane, (poly)diethylsiloxane, (poly)diphenylsiloxane, (poly)methylphenylsiloxane, alkyl-modified (poly)dimethylsiloxane, and azo group-containing (poly)dimethylsiloxane, and also include dimethylsilicone, phenylmethylsilicone, alkylaralkyl-modified silicone, fluorosilicone, polyether-modified silicone, fatty acid ester-modified silicone, methyl hydrogen silicone, silanol group-containing silicone, alkoxy group-containing silicone, phenol group-containing silicone, methacryl-modified silicone, acrylic-modified silicone, amino-modified silicone, carboxylic acid-modified silicone, carbinol-modified silicone, epoxy-modified silicone, mercapto-modified silicone, fluorine-modified silicone, and polyether-modified silicone. Among these, a compound having a dimethylsiloxane structure is preferred.

The low refractive index layer may be formed, for example, in such a manner that the low refractive index particles, the resin composition, and depending on necessity, the additive, such as an ultraviolet ray absorbent and a leveling agent, are mixed with a diluting solvent to prepare a coating composition for forming the low refractive index layer, and the coating composition is coated on the high refractive index layer by a known coating method, dried, and depending on necessity, cured through irradiation with an ionizing radiation, thereby forming the low refractive index layer.

Touch Panel

The touch panel is disposed depending on necessity between the display element and the antireflection film.

Examples of the touch panel include a capacitance touch panel, a resistive film touch panel, an optical touch panel, an ultrasonic touch panel, and an electromagnetic induction touch panel.

The resistive film touch panel has a basic structure, in which one pair of transparent substrates each having a conductive film are disposed with a spacer intervening therebetween in such a manner that the conductive films are directed to each other, and a circuit is connected to the basic structure.

Examples of the capacitance touch panel include a surface type and a projection type, and a projection type is frequently used. The projection type capacitance touch panel has a basic structure, in which an X-axis electrode and a Y-axis, which is perpendicular to the X-axis electrode, are disposed with an insulator intervening therebetween, to which a circuit is connected. More specifically, examples of the basic structure include such embodiments as (1) the X-axis electrode and the Y-axis electrode are formed on different surfaces of one transparent substrate, respectively, (2) the X-axis electrode, the insulator layer, and the Y-axis electrode are formed in this order on a transparent substrate, and (3) the X-axis electrode is formed on a transparent substrate, whereas the Y-axis electrode is formed on another transparent substrate, and the transparent substrates are laminated on each other through an adhesive layer or the like. Examples thereof also include an embodiment, in which a still another transparent substrate is laminated on one of these basic structures.

Additional Members

Additional members, such as a polarizing film and a phase difference film, may be provided depending on necessity between the display element and the antireflection film.

Antireflection Film

The antireflection film of the present invention contains a transparent substrate, having thereon a high refractive index layer and a low refractive index layer, in which the antireflection film has a diffusion light reflectance ($R_{SCE}$) measured under the following condition of 0.12% or less, and the antireflection film is for a display element having a total light reflectance ($R_{SCI}$) of 4.0% or more.

Measurement of Diffusion Light Reflectance:

A black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

Embodiments of the antireflection film of the present invention may be the same as the aforementioned embodiments of the antireflection film in the display device of the present invention.

Method for Selecting Antireflection Film of Display Device

The method for selecting an antireflection film of a display device of the present invention contains selecting, as an antireflection film for a display device containing a display element having a total light reflectance ($R_{SCI}$) of 4.0% or more, an antireflection film containing a transparent substrate, having thereon a high refractive index layer and a low refractive index layer, in which the antireflection film has a diffusion light reflectance ($R_{SCE}$) measured under the following condition of 0.12% or less.

Measurement of Diffusion Light Reflectance:

A black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

The display device, to which the method for selecting an antireflection film of the present invention is applied, may have a touch panel between the display element and the antireflection film.

Embodiments of the display element, the touch panel, and the antireflection film in selecting an antireflection film of the present invention may be the same as the aforementioned embodiments of the display element, the touch panel, and the antireflection film in the display device of the present invention.

The method for selecting an antireflection film of a display device of the present invention is useful since the method can efficiently select an antireflection film that prevents the image quality of the super high definition display element from being impaired while suppressing the whitening of a display device having a super high definition display element having a high reflectance.

EXAMPLE

The present invention will be described in more detail with reference to examples below, but the present invention is not limited to the examples.

1. Properties and Evaluation

The antireflection films obtained in Examples and Comparative Examples were measured and evaluated in the following manners. The results are shown in Table 1.

1-1. $R_{SCE}$ and $R_{SCI}$ of Antireflection Film

A black plate (Comoglas DFA2CG 502K (black) Series, a trade name, produced by Kraray Co., Ltd., total light transmittance: 0%, thickness: 2 mm, refractive index: 1.49) was adhered with a transparent adhesive layer having a thickness of 25 μm (Panaclean PD-S1, a trade name, produced by Panac Co., Ltd., refractive index: 1.49) to the surface of the transparent substrate of the antireflection film that was opposite to the side of the high refractive index layer to prepare a specimen. The surface of the specimen on the side of the low refractive index layer was measured for the diffusion light reflectance ($R_{SCE}$) and the total light reflectance ($R_{SCI}$) with an integrating sphere spectral photometer (CM-2002, a trade name, produced by Konica Minolta, Inc.). In the integrating sphere spectral photometer, the light source was D65, the position of the photoreceiver was +8° with respect to the normal line of the specimen, the aperture angle of the photoreceiver was 10°, the position of the light trap was −8° with respect to the normal line of the specimen, and the cover range of the light trap was 10°.

1-2. Reflectance Y Value of Antireflection Film

A black plate (Comoglas DFA2CG 502K (black) Series, a trade name, produced by Kraray Co., Ltd., total light transmittance: 0%, thickness: 2 mm, refractive index: 1.49) was adhered with a transparent adhesive layer having a thickness of 25 μm (Panaclean PD-S1, a trade name, produced by Panac Co., Ltd., refractive index: 1.49) to the surface of the transparent substrate of the antireflection film that was opposite to the side of the high refractive index layer to prepare a specimen. The surface of the specimen on the side of the low refractive index layer was measured for the reflectance Y value according to JIS Z8722:1982 with a spectral photometer (UV-2450, a trade name, produced by Shimadzu Corporation). The viewing angle was 2°, the light source was D65, and the measured wavelength was from 380 to 780 nm with an interval of 0.5 nm. The reflectance Y value was a value that was obtained with the specularly reflected light of the incident light that was incident on the surface of the specimen on the side of the low refractive index layer at an incident angle of 5° with respect to the incident angle of light incident perpendicularly on the surface of the specimen being 0°.

1-3. Confirmation of Whitening of Liquid Crystal Display Device

The antireflection film was provided on a liquid crystal display device in such a manner that the surface of the antireflection film on the side of the transparent substrate was directed to the side of the liquid crystal display device, so as to prepare a simulated liquid crystal display device. The position around the center of the surface (low refractive index layer) of the simulated liquid crystal display device was irradiated with an LED light in the perpendicular direction of the simulated liquid crystal display device in a darkroom, and a position that was remote from the position irradiated with the LED light in the simulated liquid crystal display device was visually confirmed for the extent of whitening in the same direction. The observation was performed by 20 persons, and the respective persons evaluated for the whitening under the following standard.
1: Whitening was not recognized.
2: Whitening was slightly recognized but produced no problem.
3: Whitening was recognized and was in a problematic level.

A specimen with the average point of the 20 persons of 1.1 or less was evaluated as AA, a specimen with the average point of more than 1.1 and 1.5 or less was evaluated as A, a specimen with the average point of more than 1.5 and 2.0 or less was evaluated as B, a specimen with the average point of more than 2.0 and 2.5 or less was evaluated as C, and a specimen with the average point of more than 2.5 and 3.0 or less was evaluated as D.

Two liquid crystal display elements, i.e., a display element A (total light reflectance ($R_{SCI}$): 7.8%, number of pixels: 3,840×2,160, size: 55 inch diagonal) and a display element B (total light reflectance ($R_{SCI}$): 6.7%, number of pixels: 1,920×1,080, size: 40 inch diagonal) were prepared, and the simulated liquid crystal display devices were prepared for each of the liquid crystal display elements and subjected to the aforementioned measurements.

The total light reflectance ($R_{SCI}$) of the display element was measured with an integrating sphere spectral photometer (CM-2002, a trade name, produced by Konica Minolta, Inc.). In the integrating sphere spectral photometer, the light source was D65, the position of the photoreceiver was +8° with respect to the normal line of the display element, the aperture angle of the photoreceiver was 10°, the position of the light trap was −8° with respect to the normal line of the display element, and the cover range of the light trap was 10°.

1. Preparation of Antireflection Film

Example 1

On a triacetyl cellulose film having a thickness of 80 μm (refractive index: 1.49), a coating composition for forming a hardcoat layer having the following formulation was coated, dried and irradiated with an ultraviolet ray, thereby forming a hardcoat layer having a thickness of 10 μm, a refractive index of 1.52 and a pencil hardness of 2H. Subsequently, on the hardcoat layer, a coating composition for forming a high refractive index layer having the following formulation was coated, dried and irradiated with an ultraviolet ray, thereby forming a high refractive index layer having a thickness of 130 nm and a refractive index of 1.60. Subsequently, on the high refractive index layer, a coating composition for forming a low refractive index layer having the following formulation was coated, dried and irradiated with an ultraviolet ray, thereby forming a low refractive index layer having a thickness of 100 nm and a refractive index of 1.30, and thus an antireflection film was provided.

Preparation of Coating Composition for Forming Hardcoat Layer 1.6 parts by mass of a photopolymerization initiator (Irgacure 127, a trade name, produced by BASF AG, 2-hydroxy-1-(4-(4-(2-hydroxy-2-methylpropionyl)benzyl)phenyl)-2-methylpropan-1-one) was added to 58.3 parts by mass of a diluting solvent (methyl isobutyl ketone/cyclohexanone=8/2), and the mixture was agitated until no undissolved residue remained. 40 parts by mass of a photocurable resin (Beamset 577, a trade name, produced by Arakawa Chemical Industries, Ltd.) was added thereto, and the mixture was agitated until no undissolved residue remained. Finally, 0.1 parts by mass of a leveling agent (Seikabeam 10-28 (MB), a trade name, produced by Dainichiseika Color & Chemicals Mfg. Co., Ltd.) was added thereto, and the mixture was agitated to prepare a coating composition for forming a hardcoat layer.

Preparation of Coating Composition for Forming High Refractive Index Layer 0.1 parts by mass of a photopolymerization initiator (Irgacure 127, a trade name, produced by BASF AG) was added to 92.6 parts by mass of a diluting solvent (methyl isobutyl ketone/cyclohexanone/methyl ethyl ketone=4/2/4), and the mixture was agitated until no undissolved residue remained. 3 parts by mass of a photocurable resin (Beamset 577, a trade name, produced by Arakawa Chemical Industries, Ltd.) was added thereto, and the mixture was agitated until no undissolved residue remained. 0.04 parts by mass of slipping particles (SIRMIBK-H84, a trade name, produced by CIK Nanotek Corporation, solid content: 30% by mass, average primary particle diameter: 30 nm), 4.1 parts by mass of zirconium oxide (MZ-230X, a trade name, produced by Sumitomo Osaka Cement Co., Ltd., solid content: 32.5% by mass, average primary particle diameter: 15 to 50 nm), and 0.03 parts by mass of a leveling agent (Seikabeam 10-28 (MB), a trade name, produced by Dainichiseika Color & Chemicals Mfg. Co., Ltd.) were added thereto, and immediately thereafter, 0.13 parts by mass of a dispersant (Disperbyk 163, a trade name, produced by BYK-Chemie Japan K.K.) was added thereto, and the mixture was dispersed with a paint maker for 10 hours to prepare a coating composition for forming a high refractive index layer.

Preparation of Coating Composition for Forming Low Refractive Index Layer 0.2 parts by mass of a photopolymerization initiator (Irgacure 127, a trade name, produced by BASF AG) was added to 91.1 parts by mass of a diluting solvent (MIBK/AN=7/3) (which was an amount that provided a solid content of the final coating composition of 3% by mass), and the mixture was agitated until no undissolved residue remained. 1.2 parts by mass of a photocurable resin (KAYARAD-PET-30, a trade name, produced by Nippon Kayaku Co., Ltd.), 7.4 parts by mass of hollow silica particles (solid content: 20% by mass, average primary particle diameter: 60 nm), and 0.05 parts by mass of a leveling agent (Seikabeam 10-28 (MB), a trade name, produced by Dainichiseika Color & Chemicals Mfg. Co., Ltd.) were added thereto, and immediately thereafter, 0.05 parts by mass of a dispersant (KBM-5103, a trade name, produced by Shin-Etsu Chemical Co., Ltd.) was added thereto, and the mixture was dispersed with a paint maker for 10 hours to prepare a coating composition for forming a low refractive index layer.

Example 2

An antireflection film was obtained in the same manner as in Example 1 except that the amount of the photocurable resin in the coating composition for forming a high refractive index layer in Example 1 was changed to 2.3 parts by mass, and the amount of zirconium oxide therein was changed to 4.8 parts by mass (the refractive index of the high refractive index layer after the changes was 1.60).

Example 3

An antireflection film was obtained in the same manner as in Example 1 except that the amount of the photocurable resin in the coating composition for forming a high refractive index layer in Example 1 was changed to 1.7 parts by mass, the amount of zirconium oxide therein was changed to 5.4 parts by mass, the amount of the photocurable resin in the coating composition for forming a low refractive index layer in Example 1 was changed to 0.8 parts by mass, and the amount of the hollow silica particles therein was changed to 7.8 parts by mass (the refractive index of the high refractive index layer after the changes was 1.63, and the refractive index of the low refractive index layer after the changes was 1.29).

Example 4

An antireflection film was obtained in the same manner as in Example 3 except that zirconium oxide in Example 3 was changed to antimony pentoxide (the refractive index of the high refractive index layer after the change was 1.58).

Comparative Example 1

An antireflection film was obtained in the same manner as in Example 1 except that the coating composition for forming a high refractive index layer in Example 4 was used, in which the amount of the photocurable resin was changed to 0.5 parts by mass, and the amount of antimony pentoxide was changed to 6.6 parts by mass, the amount of the photocurable resin in the coating composition for forming a low refractive index layer in Example 1 was changed to 0.2 parts by mass, the amount of the hollow silica particles therein was changed to 7.5 parts by mass, and 0.9 parts by mass of a fluorine-containing polymer (Opstar JN35, a trade name, produced by JSR Corporation, solid content: 20% by mass) was added thereto (the refractive index of the high refractive index layer after the changes was L63, and the refractive index of the low refractive index layer after the changes was 1.300).

Comparative Example 2

An antireflection film was obtained in the same manner as in Example 1 except that the coating composition for forming a low refractive index layer in Comparative Example 1 was used, in which the amount of the photocurable resin was changed to 1.0 part by mass, the amount of the hollow silica particles was changed to 7.6 parts by mass, and the amount of the fluorine-containing polymer was changed to 0.0 part by mass (the refractive index of the low refractive index layer after the changes was 1.295).

Comparative Example 3

An antireflection film was obtained in the same manner as in Comparative Example 2 except that the high refractive index layer had a two-layer structure, in which the high refractive index layer (A) on the side of the hardcoat layer was formed to have a thickness of 50 nm with the coating composition for forming a high refractive index layer in Example 4, and the high refractive index layer (B) on the side of the low refractive index layer was formed to have a thickness of 100 nm with the coating composition for forming a high refractive index layer in Example 3.

TABLE 1

|  | Antireflection film | | | | | Whitening | |
|---|---|---|---|---|---|---|---|
|  | $R_{SCE}$ (%) | $R_{SCI}$ (%) | $R_{SCE}/R_{SCI}$ | $R_{SCE}/(R_{SCI} - R_{SCE})$ | Y value (%) | Element A | Element B |
| Example 1 | 0.09 | 0.64 | 0.14 | 0.16 | 0.45 | AA | AA |
| Example 2 | 0.11 | 0.50 | 0.22 | 0.28 | 0.31 | A | A |
| Example 3 | 0.11 | 0.27 | 0.41 | 0.69 | 0.10 | B | B |
| Example 4 | 0.11 | 0.48 | 0.23 | 0.30 | 0.30 | A | A |
| Comparative Example 1 | 0.16 | 0.43 | 0.37 | 0.59 | 0.18 | D | D |
| Comparative Example 2 | 0.14 | 0.32 | 0.44 | 0.78 | 0.14 | C | C |
| Comparative Example 3 | 0.13 | 0.38 | 0.34 | 0.52 | 0.21 | C | C |

It was apparent from the results shown in Table 1 that the display devices of Examples 1 to 4 used the antireflection films having a suppressed value for $R_{SCE}$, and thus were able to suppress whiteness recognized with a display element having $R_{SCI}$ of 4.0% or more.

INDUSTRIAL APPLICABILITY

The antireflection film and the display device of the present invention are useful since the whitening due to reflected light of a super high definition display element having a high reflectance can be suppressed while suppressing reflection on the surface of the display device, thereby preventing the image quality of the super high definition display element from being impaired.

Furthermore, the method for selecting an antireflection film of the present invention is useful since such an antireflection film can be efficiently selected that is capable of suppressing the whitening while suppressing reflection on a surface of a super high definition display element, thereby preventing the image quality of the super high definition display element from being impaired.

DESCRIPTION OF SYMBOLS 1 display element
2 antireflection film
21 transparent substrate
22 hardcoat layer
23 high refractive index layer
24 low refractive index layer
3 touch panel
10 display device

The invention claimed is:
1. An antireflection film comprising a transparent substrate, having thereon a high refractive index layer and a low refractive index layer,
   the high refractive index layer comprising a curable resin composition and high refractive index particles, and the content of high refractive index particles in the high refractive index layer being from 35 to 75 parts by mass per 100 parts by mass of the curable resin composition,
   the high refractive index particles being at least one selected from titanium oxide and zirconium oxide, and the antireflection film having a diffusion light reflectance ($R_{SCE}$) measured under the following condition of 0.12% or less, measurement of the diffusion light reflectance being determined by adhering a black plate with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

2. An antireflection film according to claim 1, wherein the antireflection film has a layer structure consisting essentially of a transparent substrate, having thereon a high refractive index layer and a low refractive index layer.

3. An antireflection film according to claim 1, wherein the antireflection film has a layer structure consisting essentially of a transparent substrate, a hard coat layer on the transparent substrate, a high refractive index layer, and a low refractive index layer.

4. A display device comprising a display element having a total light reflectance ($R_{SCI}$) of 4.0% or more, having thereon an antireflection film, the antireflection film comprising a transparent substrate, having thereon a high refractive index layer and a low refractive index layer, the high refractive index layer comprising a curable resin composition and high refractive index particles, and the content of high refractive index particles in the high refractive index layer is from 35 to 75 parts by mass per 100 parts, by mass of the curable resin composition, the high refractive index particles being at least one selected from titanium oxide and zirconium oxide, and the antireflection film having a diffusion light reflectance ($R_{SCE}$) measured under the following condition of 0.12% or less, measurement of the diffusion light reflectance: a black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

5. The display device according to claim 4, wherein the antireflection film has a ratio ($R_{SCE}/R_{SCI}$) of the diffusion light reflectance ($R_{SCE}$) and a total light reflectance ($R_{SCI}$) measured under the following condition of 0.32 or less, measurement of the total light reflectance: a black plate is adhered with a transparent adhesive to a surface of the transparent substrate of the antireflection film that is opposite to the side of the high refractive index layer to prepare a specimen, and a surface of the specimen on the side of the low refractive index layer is measured for a total light reflectance ($R_{SCI}$).

6. The display device according to claim 4, wherein the antireflection film has a specular reflectance Y value measured under the following condition of 0.5% or less, measurement of the specular reflectance Y value of the antireflection film: a black plate is adhered with a transparent adhesive to a surface of the transparent substrate of the antireflection film that is opposite to the side of the high refractive index layer to prepare a specimen, and a surface of the specimen on the side of the low refractive index layer is measured for a specular reflectance Y value.

7. The display device according to claim 4, wherein the low refractive index layer comprises low refractive index particles.

8. The display device according to claim 4, wherein the display element has a number of pixels of 3,840×2,160 or more.

9. The display device according to claim 4, wherein the display device comprises a touch panel on the display element, and comprises the antireflection film on the touch panel.

10. A method for selecting an antireflection film of a display device, comprising selecting, as an antireflection film for a display device comprising a display element having a total light reflectance ($R_{SCI}$) of 4.0% or more, an antireflection film which comprises a transparent substrate, having thereon a high refractive index layer and a low refractive index layer, wherein the high refractive index layer comprises a curable resin composition and high refractive index particles, and the content of high refractive index particles in the high refractive index layer is from 35 to 75 parts by mass per 100 parts, by mass of the curable resin composition, and wherein the high refractive index particles are at least one selected from titanium oxide and zirconium oxide, and has a diffusion light reflectance ($R_{SCE}$) measured under the following condition of 0.12% or less, measurement of the diffusion light reflectance: a black plate is adhered with a transparent adhesive to a surface of the transparent substrate of the antireflection film that is opposite to the side of the high refractive index layer to prepare a specimen, and a surface of the specimen on the side of the low refractive index layer is measured for a diffusion light reflectance ($R_{SCE}$).

* * * * *